United States Patent [19]

Sasaki et al.

[11] Patent Number: 4,567,238

[45] Date of Patent: * Jan. 28, 1986

[54] POLYAMIDE-RUBBER BLENDED COMPOSITION

[75] Inventors: Koji Sasaki; Junji Koizumi, both of Aichi, Japan

[73] Assignee: Toyoda Gosei Co., Ltd., Nishikasugai, Japan

[ * ] Notice: The portion of the term of this patent subsequent to Jan. 28, 2003 has been disclaimed.

[21] Appl. No.: 666,673

[22] Filed: Oct. 31, 1984

[30] Foreign Application Priority Data

Oct. 31, 1983 [JP]  Japan ................................. 58-204502

[51] Int. Cl.$^4$ .......................... C08F 8/00; C08L 31/00
[52] U.S. Cl. .................................. 525/179; 525/113; 525/183
[58] Field of Search ........................ 525/179, 183, 113

[56] References Cited

U.S. PATENT DOCUMENTS

| | | | |
|---|---|---|---|
| 3,351,517 | 11/1967 | Willis | 525/187 |
| 3,639,651 | 1/1972 | Komuro | 525/187 |
| 4,173,556 | 11/1979 | Coran et al. | 524/169 |
| 4,297,453 | 10/1981 | Coran et al. | 525/430 |

Primary Examiner—John C. Bleutge
Assistant Examiner—A. L. Carrillo
Attorney, Agent, or Firm—Cushman, Darby & Cushman

[57] ABSTRACT

The present invention describes a polyamide-rubber blended composition having improved resistance to ozone, stress whitening and gasoline prepared by mixing together with heating the following components:

(a) from 70 to 20 volume percent of a rubber composition consisting of:
   (i) 30 to 70 volume percent of an acrylonitrile-butadine copolymer rubber containing at least 0.8 weight percent of an epoxy group in the polymer, and
   (ii) 30 to 80 volume percent of an epichlorohydrin rubber;
(b) 30 to 80 volume percent of a polyamide resin; and
(c) at least 0.15 parts by weight of a carboxylic acid having a functional group calculated in terms of the weight of the carboxyl group per 100 parts by weight of the rubber composition of component (a).

8 Claims, No Drawings

POLYAMIDE-RUBBER BLENDED COMPOSITION

FIELD OF THE INVENTION

The present invention relates to a polyamide-rubber blended composition having improved characteristics with respect to strength, flexibility and resistance to ozone, stress whitening and gasoline.

BACKGROUND OF THE INVENTION

Polyamide resins are recently attracting the attention of researchers as materials for producing more durable and lighter automotive hopes such as gasoline supply hoses. However, since polyamide resin hoses are not as flexible as rubber hoses, efforts are being made to provide high flexibility to the polyamide resins by one of the following three methods: the addition of a plasticizer to the polyamide resin; blending rubber with the polyamide resin; and block and/or graft polymerizing a dissimilar monomer onto the polyamide resin. However, the use of a plasticizer is not practically feasible because the plasticizer vaporizes with heat or is extracted with gasoline and other oils or solvents, causing a significant drop in the flexibility of the polyamide resin. The block and/or graft copolymer prepared by the third method has a low melting point and is not suitable for high-temperature use which is the principal intended application of the polyamide resin.

In order to permit use in applications where contact with gasoline and other oils or solvents is expected, the rubber for use as a component to be blended with the polyamide resin in the second method is selected from acrylonitrile-butadiene copolymer rubber (for convenience this will simply be referred to as nitrile rubber) and epichlorohydrin rubber (hereunder simply referred to as hydrin rubber). Japanese patent publication No. 14096/1980 and U.S. Pat. No. 4,173,556 show a method in which a blend of the nitrile rubber and polyamide resin is mixed with a cross-linking agent with heating so that the nitrile rubber is dispersed in the polyamide resin while the rubber is being cross-linked. Similarly, Japanese patent application (OPI) No. 5753/1982 and U.S. Pat. No. 4,297,453 show a method in which a blend of the hydrin rubber and polyamide resin is mixed with a cross-linking agent with heating so that the hydrin rubber is dispersed in the polyamide resin while the rubber is being cross-linked. However, the nitrile rubber impairs significantly an inherent high resistance to thermal aging of the polyamide resin, further the hydrin rubber reduces the good strength properties of the polyamide resin.

The present inventors previously proposed in Japanese Patent application No. 41576/1983 (corresponding to U.S. patent application Ser. No. 589,223 filed on Mar. 13, 1984) a method for preventing the drop in the resistance to thermal aging and strength properties of a polyamide resin by blending a polyamide resin with two other polymers, i.e., nitrile rubber and hydrin rubber. However, the resulting blend is inferior to the polyamide resin per se in respect to resistance to ozone, upon the Cyclic application of large strains, and resistance to stress whitening under appreciable local strains. Therefore, this three-polymer blend is not satisfactory for use for parts which are subject to significant vibrations or extreme strains.

Therefore, the present inventors continued their studies on producing a polyamide-rubber blended composition which has improved resistance to ozone and stress whitening, as well as high strength and flexibility, and significant resistance to thermal aging as well as gasoline. As a result, it has been found that the desired composition can be produced by the present invention.

SUMMARY OF THE INVENTION

The primary purpose of the present invention is to provide a polyamide-rubber blended composition having improved resistance to ozone and stress whitening, as well as high strength and flexibility, and substantial resistance to thermal aging and gasoline.

The polyamide-rubber blended composition of the present invention is prepared by mixing the following components under heating:
(a) 70-20 vol% of a rubber composition consisting of
  (i) 30-70 vol% of an acrylonitrile-butadiene copolymer rubber containing at least 0.8 wt% of an epoxy group in the polymer and (ii) 70-30 vol% of an epichlorohydrin rubber;
(b) 30-80 vol% of a polyamide resin;
(c) at least 0.15 parts by weight of a carboxylic acid having a functional group in terms of the weight of the carboxyl group per 100 parts by weight of the rubber composition specified in (a).

DETAILED DESCRIPTION OF THE INVENTION

The epoxy containing nitrile rubber (hereunder referred to as epoxy nitrile rubber) in component (a) of the composition of the present invention is a copolymer of acrylonitrile, butadiene and an epoxy containing monomers such as glycidyl acrylate, glycidyl methacrylate, vinyl glycidyl ether, allyl glycidyl ether, methaglycidyl ether or glycidyl ethers of hydroxyalkyl acrylates or hydroxyalkyl methacrylates, or a mixture thereof or a copolymer wherein acrylonitrile and butadiene is the major components are polymerized with an acrylate ester or isoprene and the epoxy-containing monomer. In either case, the epoxy nitrile rubber contains not less than 0.8 wt% of the epoxy group in the rubber. If the content of the epoxy group is less than 0.8 wt%, the resulting polyamide-rubber blended composition has an undesirably low resistance to ozone and stress whitening. It is preferred that the epoxy nitrile rubber has a bound acrylonitrile content of 10-55 wt% and a glass transition point of 10° C. or less, and those having the bound acrylonitrile content of 30-50 wt% are particularly preferred in view of compatibility with the epichlorohydrin rubber to be mixed.

The epichlorohydrin rubber in component (a) of the composition of the present invention may be a homopolymer of epichlorohydrin, copolymer of epichlorohydrin and ethylene oxide, a copolymer of epichlorohydrin and propylene oxide, or a terpolymer of epichlorohydrin, ethylene oxide or propylene oxide and allylglycidyl ether.

If the rubber composition of component (a) consisting of the epoxy nitrile rubber and epichlorohydrin rubber is less than 20 vol% of the total volume of the rubber composition and the polyamide resin, the effect of the rubber composition's improvement of the flexibility of the polyamide resin is not exhibited to the fullest extent. If the proportion of the rubber composition exceeds 70 vol%, the thermoplasticity of the polyamide resin is impaired and the resulting blend has poor processability.

The polyamide resin as component (b) of the composition of the present invention is a crystalline thermoplastic resin having an amino bond in the polymer. Examples of this polyamide resin are homopolymers such as polycaprolactam (nylon 6) and polylauryllactam (nylon 12), and copolymers such as the condensation polymer of 11-aminoundecenoic acid (nylon 11), polyhexamethylene azelamide (nylon 6,9) and polyhexamethylene sebacamide (nylon 6,10), as well as polyamide resins prepared by block and/or graft copolymerization of these comonomers with other monomers. preferred polyamide resins are those onto which a dissimilar monomer is block and/or graft polymerized in such an amount that it does not greatly reduce the melting point of the polyamide resin.

The proportions of the epoxy nitrile rubber and hydrin rubber to be blended to form the rubber compositions (a) or (c) are such that the epoxy nitrile rubber is 30-70 vol%, preferably 40-60 vol%, of the total volume of the two rubbers, and the hydrin rubber is 70-30 vol%, preferably 60-40 vol%, on the same basis. If the epoxy nitrile rubber is more than 70 vol% or less than 30 vol%, the ozone resistance of the final composition is appreciably reduced. If the amount of the epoxy nitrile rubber is less than 30 vol%, the resistance to stress whitening of the composition is also decreased by a significant degree.

The polyamide-rubber blended composition of the present invention may contain carbon black, white filler, plasticizer and processing aid(s) for the purpose of providing further improved strength and processability. If desired, the composition may also contain various additives such as stabilizers and color pigments which are commonly used with resins and rubbers.

Illustrative carboxylic acids having a functional group that are used in the blended composition of the present invention include aliphatic dicarboxylic acids such as adipic acid, aromatic dicarboxylic acids such as phthalic acid, polyvalent carboxylic acids such as trimellitic acid, amino acids such as 6-amino-n-caproic acid, thiolic acids such as thioglycollic acid, and acid anhydrides such as maleic anhydride and phthalic anhydride. These carboxylic acids must be added in an amount of at least 0.15 part by weight in terms of the weight of the carboxyl group for 100 parts by weight of rubber composition (a). If the amount of the carboxylic acid component is less than 0.15 parts by weight in terms of the carboxyl group, the resulting polyamide-rubber blended composition has a significantly decreased processability.

Components (a), (b) and (c) are conveniently blended in any of the devices that permit controlled heating at temperatures higher than the melting point of the polyamide resin (b), such as Banbury mixer, pressure kneader, Brabender mixer, kneader extruder and heat transfer rolls. After heating the devices employed to a temperature higher than the melting point of the polyamide resin, this resin, as well as the epoxy nitrile rubber, hydrin rubber, carboxylic acid having a functional group and any suitable additives are charged into the vessel and kneaded until a homogeneous blended composition is obtained.

In a more preferred embodiment, the epoxy nitrile rubber and hydrin rubber are kneaded in a common rubber mixer such as a Banbury mixer, open rolls, pressure kneader or Brabender mixer, and thereafter, the polyamide resin is blended into the rubber mixture under heating in the presence of the carboxylic acid having a functional group. This method is effective for providing a blended composition having further improved resistance to ozone and stress whitening. If desired, the carboxylic acid having a functional group may be mixed with the polyamide resin simultaneously with the epoxy nitrile rubber and hydrin rubber.

Typical working examples of the present invention as well as comparative examples are shown below.

EXAMPLES 1 TO 19 AND COMPARATIVE EXAMPLES 1-16

In Examples 1 to 19, the epoxy nitrile rubbers, hydrin rubbers, cross-linking agent 8 and nickel diethyl dithiocarbamate (a stabilizer) listed in Tables 1 to 4 were charged into a Brabender mixer in the proportions indicated. Each formulation was mixed for 5 minutes at a rotor speed of 60 rpm while the temperature in the chamber was held at 60° C.

The resulting rubber compositions and the polyamide resins identified in Tables 1 to 4 were weighed in the proportions listed in the tables, and charged into a Brabender mixer and mixed at a rotor speed of 80 rpm while the temperature in the chamber was held at 190° C. As the mixing continued, the mixing torque increased to a maximum value and thereafter decreased. The mixing was continued for an additional 15 minutes until the torque almost reached a steady value. In Example 7, no pronounced maximum value of torque was observed, but the mixing was continued for 15 minutes as in the other Examples.

In Comparative Examples 1 to 16, the nitrile rubbers and/or hydrin rubbers shown in Tables 1 to 4, cross-linking agent or accelerator (m-phenylene bismaleimide, dibenzothiazyl disulfide or adipic acid), and stabilizer were mixed in the proportions also shown in the tables. The so prepared rubber compositions were then mixed with the polyamide resin. In Comparative Examples 1, 2 and 4, the mixing was continued for 20 minutes, and in Comparative Example 3, the mixing period was 30 minutes. In the other Comparative Examples, the mixing was continued for 15 minutes although no maximum of torque was observed in some Comparative Examples. The sample of Comparative Example 15 was made of the polyamide resin alone.

The physical properties (tensile strength and elongation at break) of the samples prepared in the Examples and Comparative Examples, as well as their resistance to ozone and stress whitening, are shown in Tables 1 to 4.

The sample of Comparative Example 1 shown in Table 1 was a blended composition of nylon and common epoxy-free nitrile rubber. Cracks developed in the surface of this sample when it was subject to 23 hours of cyclic application of 0–30% elongation. This shows that the sample will perform very poorly upon exposure to ozone under hostile conditions.

The sample of Comparative Example 2 was a ternary blended composition of common epoxy-free nitrile rubber, hydrin rubber and the polyamide resin. The sample of Comparative Example 3 was a blend of the hydrin rubber and the polyamide resin. The sample of comparative Example 4 was a ternary blend of a carboxyl-containing nitrile rubber, hydrin rubber and the polyamide resin. These three samples had a slightly improved ozone resistance as compared with the sample of Comparative Example 1, but the improvement was not as great as desired. Furthermore, the samples of Comparative Examples 2 to 4 had low resistance to stress whitening and were prone to turn white.

The samples of Comparative Examples 5 to 10 and Examples 1 to 5 were blended compositions using the epoxy nitrile rubber, hydrin rubber and the polyamide resin. When the proportion of the hydrin rubber was 70 to 30 vol% of the total volume of the rubber composition as in Examples 1 to 5, the ozone resistance was far better than that obtained in Comparative Examples 1 to 4. The samples of Examples 1 to 5 also had high resistance to stress whitening. However, no improvement in ozone resistance was obtained when the proportion of the hydrin rubber was more than 70 vol% or less than 30 vol% of the total volume of the rubber composition (Comparative Examples 5 to 7 and 8 to 9).

Table 2 shows the effects of the epoxy content of the nitrile rubber (Comparative Examples 11 and 12, and Examples 6 and 3), as well as the effects of the amount of adipic acid (Comparative Examples 13 and 14, and Examples 7 to 9 and 3) on the resistance to ozone and stress whitening of the final polyamide-rubber blend composition. When the content of the epoxy group in the nitrile rubber was less than 0.8 wt% as in Comparative Examples 11 and 12, no great improvement in the ozone resistance was achieved. The samples of Examples 6 and 3 containing more than 0.8 wt% of the epoxy group in the nitrile rubber exhibited an appreciable improvement in the resistance to ozone and stress whitening. In Comparative Examples 13 and 14, adipic acid was added in an amount of less than 0.15 parts by weight, in terms of the weight of the caboxyl group, per 100 parts by weight of the combination of the epoxy nitrile rubber and hydrin rubber. During the mixing operation, the polyamide resin was cross-linked by the epoxy nitrile rubber compound and the resulting blend was so poorly thermoplastic that its shaping was practically impossible. On the other hand, Examples 7 to 9 and 3 using more than 0.15 parts by weight of the adipic acid in terms of the weight of the epoxy group provided blended compositions having the improved resistance to ozone and stress whitening without causing the cross-linking of the polyamide resin by the epoxy nitrile rubber.

Table 3 shows the effect of the volume proportion of the rubber composition with respect to the final polyamide-rubber blended composition. When the proportion of the rubber composition was less than 20 vol% of the blend, a high 50% tensile stress occurred and no improvement in the flexibility of the polyamide resin was attained. If the proportion of the rubber composition was more than 70 vol% of the blend (as in Comparative Example 16), the thermoplasticity of the blend was so low as to make its shaping impossible.

Table 4 shows the results of samples according to the present invention using succinic acid or 6-amino-n-caproic acid instead of adipic acid as the cross-linking agent; epichlorohydrin-allyl glycidyl ether copolymer or epichlorohydrin-ethylene oxide copolymer instead of epichlorohydrin-ethylene oxide-allyl glycidyl ether terpolymer as the hydrin rubber; and nylon 11 instead of nylon 12 as the polyamide resin. All of the modified samples exhibited high resistance to ozone and stress whitening.

The polyamide-rubber blended composition of the present invention provides a product having high flexibility and strength, as well as the significant resistance to ozone, stress whitening, thermal aging and gasoline. Thereore, the composition of the present invention will find extensive use not only in automotive fuel hoses, diaphragms and boots, but also in various products in automotive engine compartments as well as in other applications in which fabricated articles made of the blended composition are exposed to an ozone- and/or gasoline-containing environment.

TABLE 1

| | Comparative Example 1 | Comparative Example 2 | Comparative Example 3 | Comparative Example 4 | Comparative Example 5 | Comparative Example 6 | Comparative Example 7 | Example 1 | Example 2 | Example 3 | Example 4 | Example 5 | Comparative Example 8 | Comparative Example 9 | Comparative Example 10 |
|---|---|---|---|---|---|---|---|---|---|---|---|---|---|---|---|
| Composition (parts by weight) | | | | | | | | | | | | | | | |
| Nylon 12[*1] | 40 | 40 | 40 | 40 | 40 | 40 | 40 | 40 | 40 | 40 | 40 | 40 | 40 | 40 | 40 |
| Nitrile rubber No. 1[*2] | 60 | 30 | — | — | — | — | — | — | — | — | — | — | — | — | — |
| Nitrile rubber No. 2[*3] | — | — | — | 30 | — | — | — | — | — | — | — | — | — | — | — |
| Nitrile rubber No. 5[*4] | — | 40 | 80 | — | 60 | 50 | 45 | 40 | 35 | 30 | 25 | 20 | 15 | 10 | — |
| Hydrin rubber No. 1[*5] | — | — | — | 40 | — | 13 | 20 | 27 | 33 | 40 | 47 | 53 | 60 | 67 | 80 |
| Adipic acid | 1 | 1 | 1 | 1 | 0.5 | 0.5 | 0.5 | 0.5 | 0.5 | 0.5 | 0.5 | 0.5 | 0.5 | 0.5 | 0.5 |
| Nickel diethyldithiocarbamate | 2 | 2 | 2 | 2 | — | — | — | — | — | — | — | — | — | — | — |
| m-Phenylenebismaleimide | 1 | 1 | — | 1 | — | — | — | — | — | — | — | — | — | — | — |
| Dibenzothiazyl disulfide | — | — | 0.5 | 0.5 | — | — | — | — | — | — | — | — | — | — | — |
| Stearic acid | 0.5 | 0.5 | — | — | 0.5 | 0.5 | 0.5 | 0.5 | 0.5 | 0.5 | 0.5 | 0.5 | 0.5 | 0.5 | 0.5 |
| Content of epoxy group in nitrile rubber (wt %) | 0 | 0 | — | 0 | 2.12 | 2.12 | 2.12 | 2.12 | 2.12 | 2.12 | 2.12 | 2.12 | 2.12 | 2.12 | — |
| **Polymer composition (vol %)[*6]** | | | | | | | | | | | | | | | |
| Overall rubber volume ratio | 60 | 60 | 60 | 60 | 60 | 60 | 60 | 60 | 60 | 60 | 60 | 60 | 60 | 60 | 60 |
| Nitrile rubber volume ratio | 100 | 50 | 0 | 50 | 100 | 83 | 75 | 67 | 58 | 50 | 42 | 33 | 25 | 17 | 0 |
| Hydrin rubber volume ratio | 0 | 50 | 100 | 50 | 0 | 17 | 25 | 33 | 42 | 50 | 58 | 67 | 75 | 83 | 100 |
| **Initial physical properties[*7]** | | | | | | | | | | | | | | | |
| Tensile strength (kg/cm$^2$) | 242 | 196 | 116 | 202 | 276 | 242 | 232 | 225 | 220 | 205 | 195 | 130 | 110 | 89 | Shaping impossible |
| Elongation at break (%) | 250 | 240 | 150 | 280 | 270 | 260 | 260 | 270 | 280 | 300 | 260 | 210 | 200 | 170 | |
| Ozone resistance[*8] | 23 | 34 | 96 | 56 | 40 | 37 | 60 | 260 | 500 | 500 | 500 | 210 | 55 | 22 | |
| Cracking time (hrs) | | | | | | | | | | | | | | | |
| **Resistance to stress whitening[*9]** | | | | | | | | | | | | | | | |
| Percent elongation for whitening (%) | Not whitened | 40 | 20 | 60 | Not whitened | Not whitened | Not whitened | Not whitened | Not whitened | Not whitened | Not whitened | 100 | 50 | 30 | |
| Degree of whitening | | B | B | B | | | | | | | | A | B | B | |

Notes to Table 1:
[*1] polylauryllactam; "L-1940" of Daicel Chemical Industries, Ltd.
[*2] Acrylonitrile-butadiene copolymer rubber; experimental product, bound acrylonitrile = 40 wt %, Mooney viscosity, $ML_{1+4}$(100° C.) = 52
[*3] Carboxyl-containing acrylonitrile-butadiene copolymer rubber; experimental product, bound acrylonitrile = 40 wt %, carboxyl group content = 2.62 wt % (in monomeric methacrylic acid), Mooney viscosity, $ML_{1+4}$(100° C.) = 46
[*4] Epoxy-containing acrylonitrile-butadiene copolymer rubber; experimental product, bound acrylonitrile = 40 wt %, epoxy group content = 2.12 wt % (in monomeric glycidyl methacrylate), Mooney viscosity, $ML_{1+4}$(100° C.) = 51
[*5] Epichlorohydrin-ethylene oxide-allyl glycidyl ether copolymer rubber; Zecron 3100 of The Japanese Geon Co., Ltd.
[*6] Overall rubber volume ratio = $(V_N + V_E)/(V_N + V_E + V_A) \times 100$; Nitrile rubber volume ratio = $V_N/(V_N + V_E) \times 100$; Hydrin rubber volume ratio = $V_E/(V_N + V_E) \times 100$; wherein $V_N$, $V_E$ and $V_A$ represent the volumes of nitrile rubber, hydrin rubber and polyamide resin, respectively, in a unit blend composition.
[*7] at 20 ± 3° C. and a drawing speed of 50 mm/min
[*8] The sample deteriorated at an ozone concentration of 50 ± 5 pphm, elongation of 0–30%, cyclic strain of 60 rpm and temperature of 40 ± 2° C. The time when cracking was found to occur by observation at magnification 10 was designated cracking time.
[*9] The sample was drawn at a speed of 50 mm/min (20 ± 3° C.), and percent elongation at which the sample turned white was designated percent elongation for whitening. The rating indices for whitening were as follows:
A . . . The sample whitened only slightly and most of it was transparent.
B . . . The sample whitened extensively and turned opaque.

Method of Forming Test Piece Sheets And Conditions of Their Annealing

A sample material sandwiched between aluminum foils was placed in a mold (210° C.); after preheating for 2 minutes, the material was pressed under an oil press (ca.100 kg/cm$^2$) for 10 minutes; the resulting sheet 1 mm thick was removed from the mold, quenched with water and stripped of the aluminum foils. The sheet without aluminum foils was then annealed in vacuum at 150° C. for 1 hour.

TABLE 2

|  | Comparative Example 11 | Comparative Example 12 | Example 6 | Example 3 | Comparative Example 13 | Comparative Example 14 | Example 7 | Example 8 | Example 9 |
|---|---|---|---|---|---|---|---|---|---|
| Composition (parts by weight) | | | | | | | | | |
| Nylon 12*[1] | 40 | 40 | 40 | 40 | 40 | 40 | 40 | 40 | 40 |
| Nitrile rubber No. 1*[2] | 30 | — | — | — | — | — | — | — | — |
| Nitrile rubber No. 3*[3'] | — | 30 | — | — | — | — | — | — | — |
| Nitrile rubber No. 4*[4'] | — | — | 30 | — | — | — | — | — | — |
| Nitrile rubber No. 5*[4] | — | — | — | 30 | 30 | 30 | 30 | 30 | 30 |
| Hydrin rubber No. 1*[5] | 40 | 40 | 40 | 40 | 40 | 40 | 40 | 40 | 40 |
| Adipic acid | 0.5 | 0.5 | 0.5 | 0.5 | — | 0.12 | 0.25 | 0.75 | 1 |
| Nickel diethyldithiocarbamate | 1 | 1 | 1 | 1 | 1 | 1 | 1 | 1 | 1 |
| Stearic acid | 0.5 | 0.5 | 0.5 | 0.5 | 0.5 | 0.5 | 0.5 | 0.5 | 0.5 |
| Content of epoxy group in nitrile rubber (wt %) | 0 | 0.73 | 1.42 | 2.12 | 2.12 | 2.12 | 2.12 | 2.12 | 2.12 |
| Carboxyl group content (parts by wt.) | 0.51 | 0.51 | 0.51 | 0.51 | 0 | 0.12 | 0.23 | 0.77 | 1.03 |
| Polymer composition (vol %)*[6] | | | | | | | | | |
| Overall rubber volume ratio | 60 | 60 | 60 | 60 | 60 | 60 | 60 | 60 | 60 |
| Nitrile rubber volume ratio | 50 | 50 | 50 | 50 | 50 | 50 | 50 | 50 | 50 |
| Hydrin rubber volume ratio | 50 | 50 | 50 | 50 | 50 | 50 | 50 | 50 | 50 |
| Initial physical properties*[7] | | | | | | | | | |
| Tensile strength (kg/cm$^2$) | 48 | 80 | 147 | 205 | Shaping impossible | Shaping impossible | 188 | 186 | 193 |
| Elongation at break (%) | 50 | 160 | 290 | 300 | | | 290 | 280 | 290 |
| Ozon resistance*[8] Cracking time (hrs) | 16 | 24 | 220 | ≧500 | | | ≧500 | ≧500 | ≧500 |
| Resistance to stress whitening*[9] | | | | | | | | | |
| Percent elongation for whitening (%) | 10 | 30 | 100 | Not whitened | | | Not whitened | Not whitened | Not whitened |
| Degree of whitening | B | B | A | | | | | | |

Notes to Table 2:
*[1], *[2], and *[4] to *[9] See the Notes to Table 1.
*[3'] Epoxy-containing acrylonitrile-butadiene copolymer rubber: experimental product, bound acrylonitrile = 40 wt %, content of epoxy group = 0.73 wt % (in monomeric glycidyl methacrylate), Mooney viscosity, $ML_{1+4}$ (100° C.) = 48
*[4'] Epoxy-containing acrylonitrile-butadiene copolymer rubber: experimental product, bound acrylonitrile = 40 wt %, content of epoxy group = 1.42 wt % (in monomeric glycidyl methacrylate), Mooney viscosity, $ML_{1+4}$ (100° C.) = 44

TABLE 3

|  | Comparative Example 15 | Example 10 | Example 11 | Example 12 | Example 13 | Example 3 | Example 14 | Comparative Example 16 |
|---|---|---|---|---|---|---|---|---|
| Composition (parts by weight) | | | | | | | | |
| Nylon 12*[1] | 100 | 80 | 70 | 30 | 50 | 40 | 30 | 20 |
| Nitrile rubber No. 5*[4] | — | 10 | 15 | 20 | 25 | 30 | 35 | 40 |
| Hydrin rubber No. 1*[5] | — | 13 | 20 | 27 | 33 | 40 | 47 | 53 |
| Adipic acid | — | 0.17 | 0.25 | 0.33 | 0.42 | 0.5 | 0.58 | 0.37 |
| Nickel diethyldithiocarbamate | — | 0.33 | 0.5 | 0.37 | 0.83 | 1 | 1.17 | 1.33 |
| Stearic acid | — | 0.5 | 0.5 | 0.5 | 0.5 | 0.5 | 0.5 | 0.5 |
| Content of epoxy group in nitrile rubber (wt %) | — | 2.12 | 2.12 | 2.12 | 2.12 | 2.12 | 2.12 | 2.12 |
| Carboxyl group content (parts by wt.) | — | 0.51 | 0.51 | 0.51 | 0.51 | 0.51 | 0.51 | 0.51 |
| Polymer composition (vol %)*[6] | | | | | | | | |
| Overall rubber volume ratio | 0 | 20 | 30 | 40 | 50 | 60 | 70 | 80 |
| Nitrile rubber volume ratio | 50 | 50 | 50 | 50 | 50 | 50 | 50 | 50 |
| Hydrin rubber volume ratio | 50 | 50 | 50 | 50 | 50 | 50 | 50 | 50 |
| Initial physical properties*[7] | | | | | | | | |
| 50% tensile stress (kg/cm$^2$) | 321 | 250 | 210 | 143 | 108 | 83 | 64 | Shaping impossible |
| Tensile strength (kg/cm$^2$) | — | — | 315 | 254 | 213 | 205 | 130 | |
| Elongation at break (%) | — | — | 280 | 290 | 300 | 300 | 250 | |
| Ozone resistance*[8] Cracking time (hrs) | ≧500 | ≧500 | ≧500 | ≧500 | ≧500 | ≧500 | ≧500 | |
| Resistance to stress whitening*[9] | | | | | | | | |
| Percent elongation for whitening (%) | Not whitened | Not whitened | Not whitened | Not whitened | Not whitened | Not whitened | Not whitened | |
| Degree of whitening | | | | | | | | |

(Notes)
*[1], *[4] to *[9] See the corresponding notes to Table 1.

TABLE 4

|  | Example 3 | Example 15 | Example 16 | Example 17 | Example 18 | Example 19 |
|---|---|---|---|---|---|---|
| Composition (parts by weight) | | | | | | |
| Nylon 12*[1] | 40 | 40 | 40 | 40 | 40 | — |
| Nylon 11*[2] | — | — | — | — | — | 40 |
| Nitrile rubber No. 5*[4] | 30 | 30 | 30 | 30 | 30 | 30 |
| Hydrin rubber No. 1*[5] | 40 | 40 | 40 | — | — | — |
| Hydrin rubber No. 2*[5'] | — | — | — | 40 | — | — |
| Hydrin rubber No. 3*[5''] | — | — | — | — | 40 | — |
| Adipic acid | 0.5 | — | — | 0.5 | 0.5 | 0.5 |
| Succinic acid | — | 0.5 | — | — | — | — |
| 6-Amino-n-caproic acid | — | — | 1 | — | — | — |
| Nickel diethyldithiocarbamate | 1 | 1 | 1 | 1 | 1 | 1 |
| Stearic acid | 0.5 | 0.5 | 0.5 | 0.5 | 0.5 | 0.5 |
| Content of epoxy group in nitrile rubber (wt %) | 2.12 | 2.12 | 2.12 | 2.12 | 2.12 | 2.12 |
| Carboxyl group content (parts by wt.) | 0.51 | 0.64 | 0.57 | 0.51 | 0.51 | 0.51 |
| **Polymer composition (vol %)*[6]** | | | | | | |
| Overall rubber volume ratio | 60 | 60 | 60 | 60 | 60 | 60 |
| Nitrile rubber volume ratio | 50 | 50 | 50 | 50 | 50 | 49 |
| Hydrin rubber volume ratio | 50 | 50 | 50 | 50 | 50 | 51 |
| **Initial physical properties*[7]** | | | | | | |
| Tensile strength (kg/cm$^2$) | 205 | 183 | 186 | 211 | 185 | 220 |
| Elongation at break (%) | 300 | 260 | 260 | 260 | 260 | 320 |
| Ozone resistance*[8] Cracking time (hrs) | ≧500 | ≧500 | 285 | ≧500 | 380 | ≧500 |
| **Resistance to stress whitening*[9]** | | | | | | |
| Percent elongation for whitening (%) | Not whitened | Not whitened | Not whitened | Not whitened | Not whitened | Not whitened |
| Degree of whitening | | | | | | |

Notes to Table 4:
*[1], *[4], *[5], *[6] to *[9] See the corresponding notes to Table 1.
*[2] Condensation polymer of 11-amino-undecanoic acid: "BESN-O-TL" of Lilsan Co., Ltd.
*[5'] Epichlorohydrin-allyl glycidyl ether copolymer rubber: "Zecron 1100" of the Japanese Geon Co., Ltd.
*[5''] Epichlorohydrin-ethylene oxide copolymer rubber: "Herchlor C" of Hercules Incorporated

What is claimed is:

1. A polyamide-rubber blended composition having improved resistance to ozone, stress whitening and gasoline prepared by mixing together with heating the following components:
   (a) from 70 to 20 volume percent of a rubber composition consisting of:
      (i) 30 to 70 volume percent of an acrylonitrile-butadiene copolymer rubber containing at least 0.8 weight percent of an epoxy group in the polymer, and
      (ii) 70 to 30 volume percent of an epichlorohydrin rubber;
   (b) 30 to 80 volume percent of a polyamide resin; and
   (c) at least 0.15 parts by weight of a carboxylic acid having a functional group calculated in terms of the weight of the carboxyl group per 100 parts by weight of the rubber composition of component (a).

2. The polyamide-rubber blended composition of claim 1 in which component (i) is an epoxy-containing acrylonitrile-butadiene copolymer rubber having a bound acrylonitrile content of 10 to 55 weight percent and a glass transition point of not more than 10° C.

3. The polyamide-rubber blended composition of claim 1 in which the epichlorohydrin rubber of component (a) is a homopolymer of epichlorohydrin, a copolymer of epichlorohydrin and ethylene oxide, a copolymer of epichlorohydrin and propylene oxide or a terpolymer of epichlorohydrin, ethylene or propylene oxide and allylglycidyl ether.

4. The polyamide-rubber blended composition of claim 1 in which the polyamide resin is a crystalline thermoplastic resin having an amino bond in the polymer.

5. The polyamide-rubber blended composition of claim 1 in which the polyamide resin is polycaprolactam (nylon 6), polylauryllactam (nylon 12), the condensation polymer of 11-aminoundecanoic acid (nylon 12), polyhexamethylene azelamide (nylon 6,9) or polyhexamethylene sebacamide (nylon 6,10).

6. The polyamide-rubber blended composition of claim 1 further including at least one of carbon black, white filler, plasticizer, processing aid, stabilizer or pigment.

7. The polyamide-rubber blended composition of claim 1 in which the carboxylic acid of component (c) is an aliphatic dicarboxylic acid, an aromatic dicarboxylic acid, a polyvalent carboxylic acid, an amino acid, a thiolic acid or a carboxylic acid anhydride.

8. An ozone-, stress whitening- and gasoline-resistant hose fabricated from the polyamide-rubber blended composition of claim 1.

* * * * *